Jan. 17, 1950     C. W. APPELBERG     2,494,925
TEMPERATURE REGULATOR WITH SIGNALING DEVICE
Filed Oct. 18, 1946     4 Sheets-Sheet 2
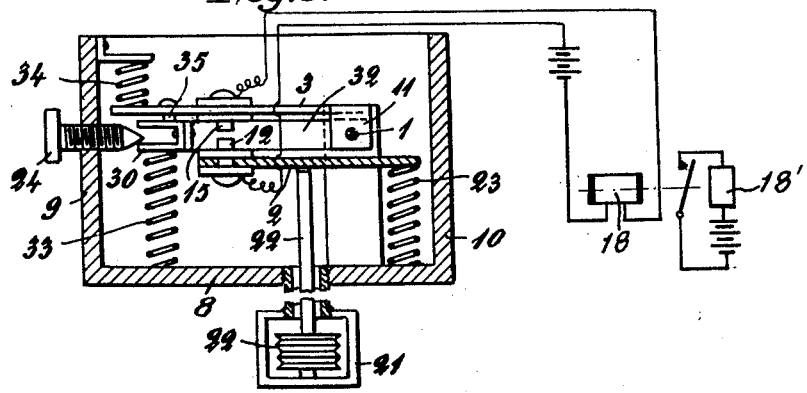
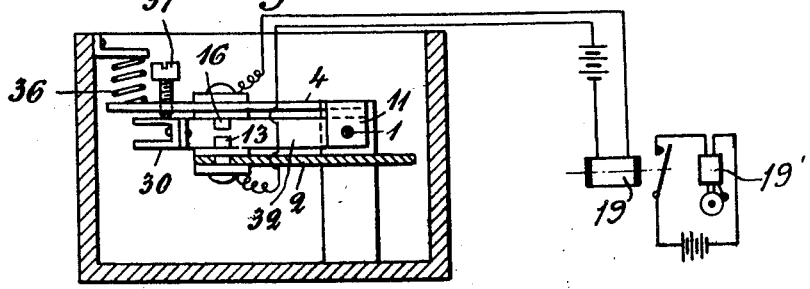
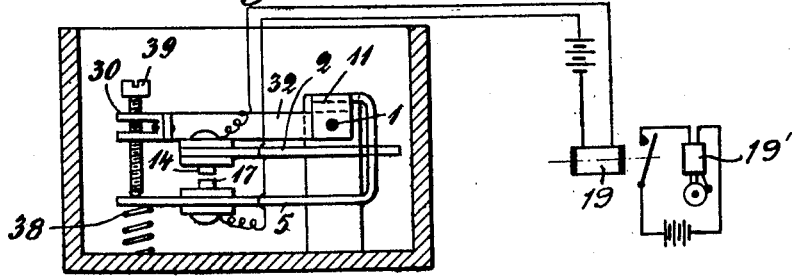
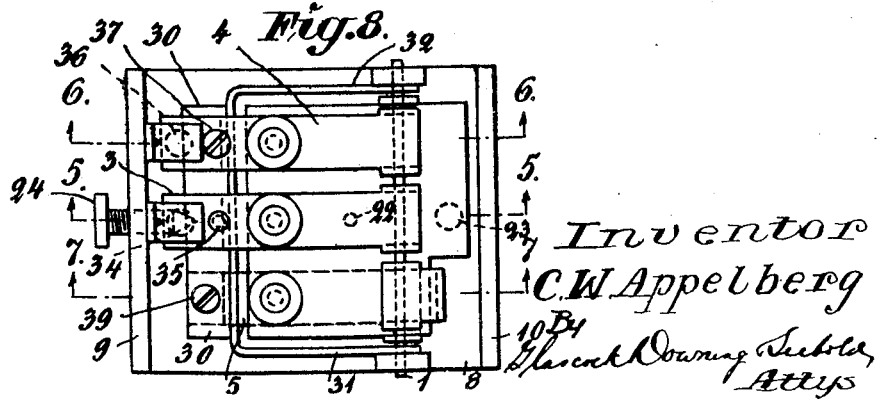
Inventor
C. W. Appelberg Jan. 17, 1950 C. W. APPELBERG 2,494,925
TEMPERATURE REGULATOR WITH SIGNALING DEVICE
Filed Oct. 18, 1946 4 Sheets-Sheet 3
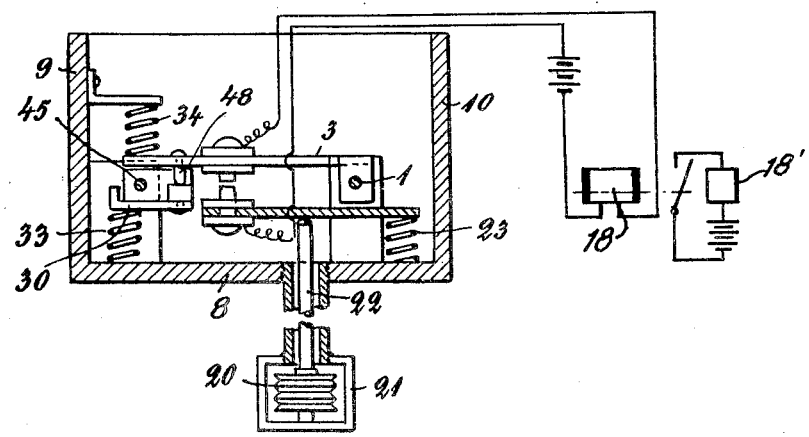
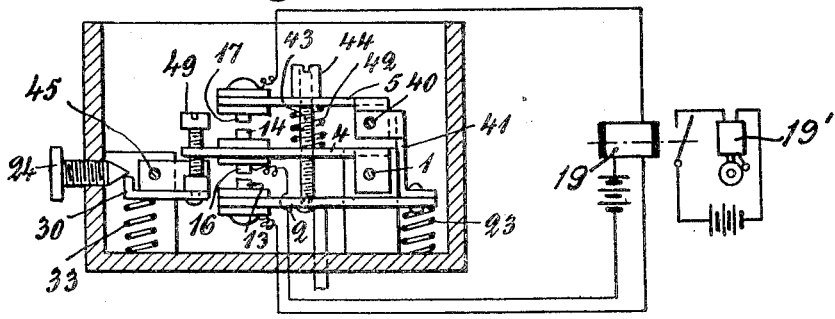
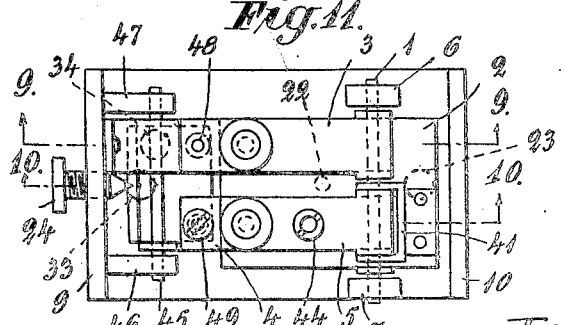
Inventor
C. W. Appelberg
By Glascock Downing & Seebold
Attys.

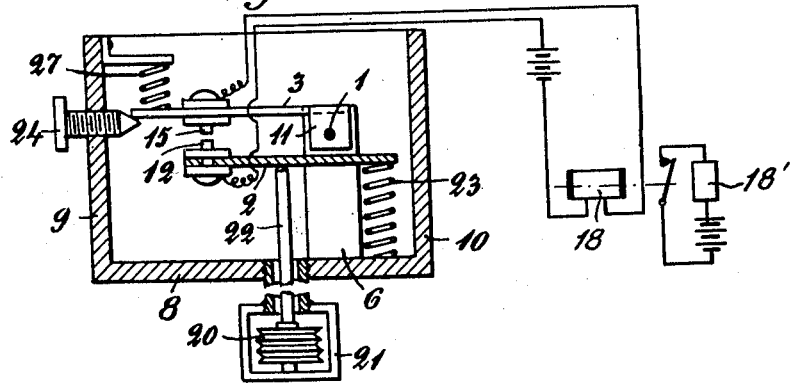
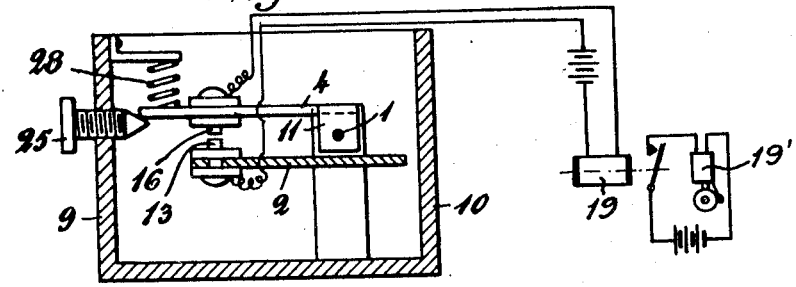
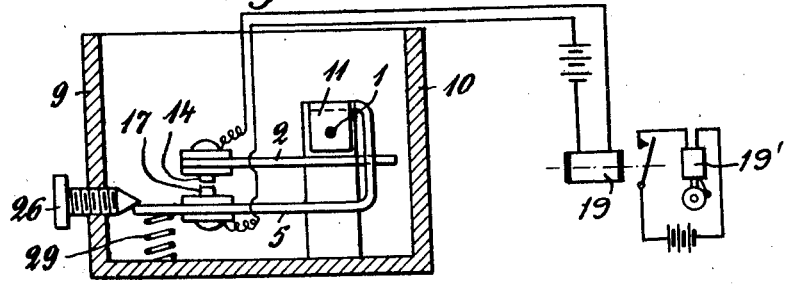
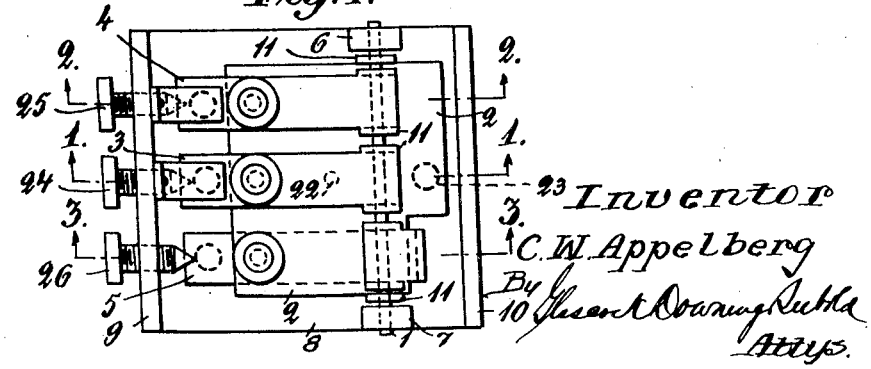

Jan. 17, 1950      C. W. APPELBERG      2,494,925
TEMPERATURE REGULATOR WITH SIGNALING DEVICE
Filed Oct. 18, 1946      4 Sheets-Sheet 4

Inventor
C. W. Appelberg

Patented Jan. 17, 1950

2,494,925

UNITED STATES PATENT OFFICE 2,494,925

TEMPERATURE REGULATOR WITH SIGNALING DEVICE

Carl Wilhelm Appelberg, Stockholm, Sweden

Application October 18, 1946, Serial No. 704,243
In Sweden October 20, 1945

5 Claims. (Cl. 177—311)

The invention relates to temperature regulators of the kind which are both arranged to regulate the supply of heat to heating apparatus for the purpose of maintaining a certain desired temperature, and also to control a signalling device adapted to give a signal when the temperature, for one reason or another, rises above or falls below the temperature which is to be maintained constant. The invention relates more particularly to such temperature regulators of this kind which are intended to be used in those cases where, with relatively low temperatures, the temperature rise or fall covers a relatively small number of degrees.

Previously known temperature regulators of the kind in question have usually been provided with separate temperature-sensitive members for temperature regulation and for signalling purposes. Other similar temperature regulators are also known, but these are of relatively complicated construction.

The present invention relates to a temperature regulator which is provided with a common temperature-sensitive member both of temperature regulation and for producing signals, and which is of a simple form of construction and is reliable and accurate in its method of operation.

The invention is clearly shown in the accompanying drawings, in which:

Figure 1 is a vertical sectional view on the line 1—1 of Figure 4, showing one form of the invention.

Figure 2 is a similar view taken on the line 2—2 of Figure 4.

Figure 3 is a vertical sectional view taken on the line 3—3 of Figure 4.

Figure 4 is a plan view of the first form of the apparatus.

Figure 5 is a vertical sectional view taken on the line 5—5 of Figure 8, showing the second form of the invention.

Figure 6 is a similar view taken on the line 6—6 of Figure 8.

Figure 7 is a vertical sectional view taken on the line 7—7 of Figure 8.

Figure 8 is a plan view of an end form of the invention.

Figure 9 is a vertical sectional view taken on the line 9—9 of Figure 11.

Figure 10 is a vertical sectional view taken on the line 10—10 of Figure 11.

Figure 11 is a plan view of the third form of the invention.

Figure 4A:
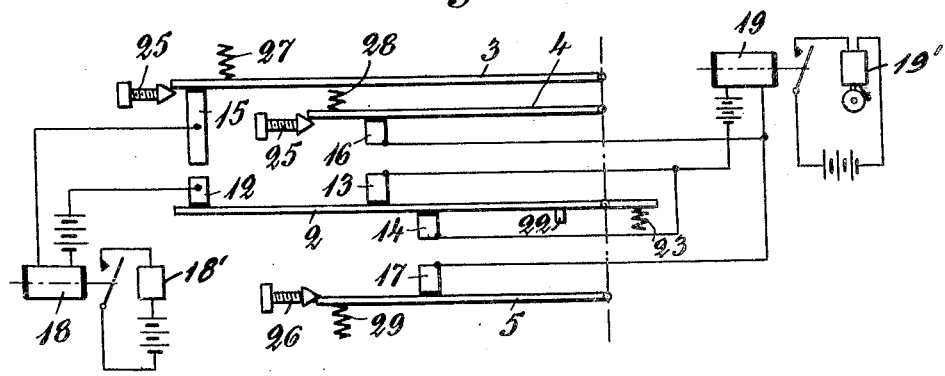
Figure 4A is a schematic wiring diagram of the arrangement shown in Figure 4.

The temperature regulator illustrated in Figs. 1-4A consists of an electric connecting apparatus actuated by a thermostat and comprising a number of contact arms 2, 3, 4, 5, pivotally mounted on a spindle 1, of which the contact arm 2 is wider than the others and takes the form of a plate extending over the entire length of the spindle 1 whilst the narrower contact arms 3, 4, 5 are arranged side by side along the spindle. This latter is mounted in two bearing brackets 6, 7, which are fitted in a bow-shaped frame 8 with vertical limbs 9, 10. The contact arms 2—5 are supported on the spindle 1 by means of lugs 11 projecting from the latter, whereby the contact arms 3 and 4 are arranged at the same level above the contact arm 2, while the contact arm 5 is arranged below the contact arm 2 as may be seen in Fig. 3. The contact arms which preferably consist of metal plates are provided with contacts which are insulated from the contact arms. The contact arm 2 is thus provided with three contacts 12, 13 and 14 adapted to cooperate with counter-contacts 15, 16 and 17 on the contact arms 3, 4 and 5. As shown in Fig. 1 the contacts 12, 15 are arranged to control the current supply circuit for a relay 18 which in turn controls the heating circuit of the heating apparatus 18'. The contacts 13, 16 and 14, 17 respectively, as shown in Figs. 2 and 3, are arranged to control the current supply circuit for a relay 19 which in turn controls the circuit for a signalling device 19'.

All the relay circuits are arranged to be controlled by a common temperature-sensitive member which is directly or indirectly connected thermally to the heating apparatus, or by a thermostat in the form of a bellows 20 which is mounted in a box 21 fixed to the frame 8 and is adapted to operate the contact arm 2 through a rod 22 as shown in Fig. 1. With the help of a spring 23 the contact arm 2 is kept constantly pressed against the upper end of the rod 22. To render possible the adjustment of the contact arms 3, 4, 5 in the correct positions in relation to the contact arm 2, adjusting screws 24, 25, 26 are provided in the vertical limb 9 of the frame, the conical points of which cooperate with the ends of the contact arms 3, 4, 5. The contact arms are kept pressed against the adjusting screws by springs 27, 28 and 29.

When the temperature regulator is functioning the adjusting screw 24 is set in such a manner that the contacts 12, 15 alternately make and break the circuit through the operation of the thermostat 20, 22 whereby the circuit for the relay 18 is alternately broken and closed. As long as the required temperature is maintained in the heating apparatus in this manner, the movement of the contact arms 2 is relatively small. In any case during this movement the contact arm cannot actuate the contacts 13, 16 and 14, 17. These contacts are so adjusted in advance by the adjusting screws 25, 26 that a relatively wide air gap is left between the cooperating contacts. If however, owing to some abnormal circumstances the temperature should rise above the temperature which corresponds to the position of the contact arm 4 set by the adjusting screw 25, the contacts 13, 16 will be closed and therefore the circuit for the relay 19, whereupon the signalling device will come into operation. If on the other hand the temperature in the heating apparatus should fall for any reason below the temperature which corresponds to the position of the contact arm 5 set by the adjusting screw 26, the contacts 14, 17 will be closed and therefore the circuit for the signalling relay 19, whereupon the signalling device will come into operation.

As previously mentioned, the temperature of the heating apparatus may be adjusted for any desired number of degrees by means of the adjusting screw 24. At the same time, however, the contact arms 4 and 5 must be moved to the corresponding positions, which is effected by the adjusting screws 25, 26, whereby the adjustment is so carried out that the higher and lower temperatures at which the signalling device is to come into operation remain the same as before.

Figure 8A:
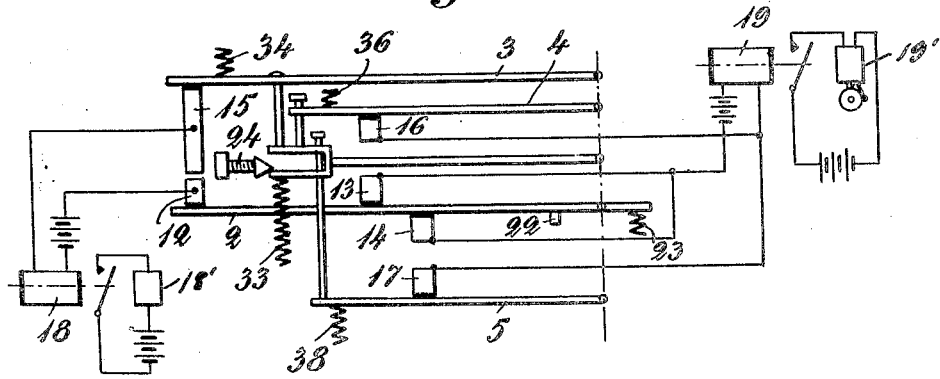
Figure 8A is a schematic wiring diagram of the form shown in Figure 8.

In the form of construction illustrated in Figs. 5–8 the temperature regulator is so constructed that the said subsequent adjustment of the position for the contact arms 4 and 5 relatively to the contact arm 2 takes place automatically on each new adjustment of the temperature which is to be maintained in the heating apparatus. In this form of construction therefore, only one adjusting screw 24 is required which is so arranged as to be able to actuate simultaneously both the contact arm 3 which controls the circuit for the heating apparatus, and the contact arms 4, 5 which control the signalling device. For this purpose a supporting bar 30 having a U-shaped cross-section is provided which extends right across the ends of the contact arms 3, 4, 5 and is pivotally suspended on the spindle 1 by means of the arms 31, 32. With the help of a spring 33 the supporting bar is kept pressed against the conical end of the adjusting screw 24 so that its height can be adjusted by means of the said screw. The contact arm 3 is held up by a spring 34 and a pin 35 against the upper side of the bar 30. In a similar manner the contact arm 4 is held, by a spring 36 and an adjusting screw 37, pressed against the upper side of the bar 30, whilst the contact arm 5 is supported by a spring 38 against an adjusting screw 39 fitted in the bar 30. Thus by means of the adjusting screws 37 and 39 the air gaps between the contacts 13, 16 and 14, 17 can be adapted to correspond to the desired upper and lower temperatures at which the signalling device is required to come into operation. On the actuation of the adjusting screw 24 movement is also transmitted by the said adjusting screws 37, 39 to the contact arms 4 and 5 at each displacement of the supporting bar 30 for the purpose of changing the temperature of the heating apparatus.

Figs. 9–11 illustrate a modified form of construction of the arrangement described in connection with Figs. 5–8 for the simultaneous actuation of all the contact arms 3, 4, 5. This arrangement differs from that previously described mainly in the fact that the contact arms 4, 5 are arranged above one another in the same vertical plane whilst the contact arm 3 is arranged at the side of the other contact arms as before. In this way an economy of space is effected and the dimensions of the temperature regulator are reduced whereby the laying out of the conductors for the contacts is simplified. The contacts 14 and 16 are in this case combined with one another so that they constitute a single continuous contact pin in the contact arm 4, whilst the contacts 13 and 17, as before, are mounted on the contact arms 2 and 5 respectively. In this case the contact arm 5 can pivot around a separate spindle 40 which is supported in a bracket 41 rigidly fixed to the contact arm 2. The contact arm 5 is actuated by a spring 42, Fig. 10, the opposite end of which presses up against the upper side of the arm 4, and which is threaded on a rod 43 the lower end of which is riveted to the contact arm 2, its upper end being screw-threaded and fitted with a nut 44 by means of which the position of the contact arm 5 can be adjusted in relation to the contact arm 4. The rod 43 passes freely through a hole in the contact arm 4.

The supporting bar 30 can in this case pivot around a separate spindle 45 mounted in a bracket 46, 47 projecting from the limb 9 of the frame. By means of the adjusting screw 24 against which the supporting bar is held by the spring 33, the supporting bar 30 can be set in various positions for the purpose of changing the temperature setting, whereby movement is transmitted partly by a pin 48 to the contact arm 3, and partly by an adjusting screw 49 to the contact arm 4. In consequence of the said connection between the contact arm 5 and the contact arms 2 and 4, the contact arm 5 will also be moved automatically to the correct position in relation to the arm 4 on every change of the temperature it is intended to maintain constant in the heating apparatus.

In cases where it is necessary to produce a signal, only when the temperature rises above, or only when it falls below the prescribed working temperature, one of the two corresponding contact devices may of course be omitted whilst in other respects the arrangement works in the manner described.

What I claim is:

1. A thermostatic regulating device comprising a heating apparatus, a heat control circuit for said apparatus, a signal control circuit for operating an alarm signal at abnormal temperatures of said apparatus, a thermostat in thermal relation with said heating apparatus, a switch member operated by said thermostat so as to follow the movements of the thermostat in both directions and controlling both said circuits, a heat control contact actuated by said switch member to make and break the heat control circuit at the working temperature of said apparatus, a signal control contact actuated by the movement of said switch member in one direction to make and break the signal control circuit at a temperature above said working temperature, another signal control contact actuated by the movement of said switch member in the opposite direction to make and break the signal control circuit at a temperature below said working temperature, means for setting said heat control contact relatively to said switch member to change the working temperature of the heating apparatus, and means for setting said signal control contacts relatively to said switch member to change the operating temperature of the alarm signal correspondingly.

2. A thermostatic regulating device as claimed in claim 1, in which the heat control contact and the signal control contacts are carried by separate contact arms swingable about a common axis.

3. A thermostatic regulating device as claimed in claim 1, in which the heat control contact and the signal control contacts are carried by separate contact arms swingable about a common axis and in which the switch member is swingable about the same axis.

4. A thermostatic regulating device comprising a heating apparatus, a heat control circuit for said apparatus, a signal control circuit for operating an alarm signal at abnormal temperatures of said apparatus, a thermostat in thermal relation with said heating apparatus, a switch member operated by said thermostat so as to follow the movements of the thermostat in both directions and controlling both said circuits, a swingable heat control contact arm actuated by said switch member to make and break the heat control circuit at the working temperature of said apparatus, a swingable signal control contact arm actuated by the movement of said switch member in one direction to make and break the signal control circuit at a temperature above said working temperature, another swingable signal control contact arm actuated by the movement of said switch member in the opposite direction to make and break the signal control circuit at a temperature below said working temperature, means for setting said heat control contact arm relatively to said switch member to change the working temperature of the heating apparatus, and means for setting said signal control contact arms relatively to said switch member to change the operating temperature of the alarm signal correspondingly.

5. A thermostatic regulating device as claimed in claim 4, in which all of the contact arms are swingable about a common axis and arranged to be actuated together by a common setting device.

CARL WILHELM APPELBERG.

REFERENCES CITED

The following references are of record in the file of this patent:

UNITED STATES PATENTS

| Number | Name | Date |
|---|---|---|
| 2,197,230 | Waddell | Apr. 16, 1940 |
| 2,208,432 | Samuels | July 16, 1940 |
| 2,409,420 | Clark | Oct. 15, 1946 |
| 2,414,799 | Campbell | Jan. 28, 1947 |
| 2,433,124 | Johnson | Dec. 23, 1947 |
| 2,439,795 | Clark | Apr. 20, 1948 |